United States Patent [19]
Montgomery

[11] Patent Number: 4,797,753
[45] Date of Patent: Jan. 10, 1989

[54] MONITOR FOR VISUALLY INDICATING WEAR ON RECORD MEDIA

[75] Inventor: Joseph D. Montgomery, Bloomington, Ill.

[73] Assignee: Minnesota Mining and Manufacturing Company, St. Paul, Minn.

[21] Appl. No.: 917,490

[22] Filed: Oct. 10, 1986

[51] Int. Cl.[4] .......................... G11B 5/00; G11B 27/36; G01N 27/72
[52] U.S. Cl. .......................................... 360/27; 360/25; 360/31
[58] Field of Search ....................... 360/27, 28, 25, 31; 324/212, 213

[56] References Cited

U.S. PATENT DOCUMENTS

| | | | |
|---|---|---|---|
| 3,659,195 | 4/1972 | Cardozo et al. | 324/212 |
| 3,872,504 | 3/1975 | Belcher | 360/27 |
| 3,897,379 | 7/1975 | DeFrancesco et al. | 360/27 |
| 3,938,184 | 2/1976 | DeFrancesco et al. | 360/28 |
| 4,003,084 | 1/1977 | Fletcher et al. | 360/25 |
| 4,101,937 | 7/1978 | Jenkins | 360/76 |
| 4,148,078 | 4/1979 | Riddle, Jr. | 360/27 |
| 4,251,882 | 2/1981 | Pfefferkorn | 324/212 |
| 4,384,308 | 5/1983 | Yanagida | 360/28 |
| 4,385,327 | 5/1983 | Pate | 360/27 |
| 4,404,603 | 9/1983 | Warren et al. | 324/212 |

OTHER PUBLICATIONS

American National Standards Institute Standard S4.3-1972 (IEEE Std. 193-1971).
"A Microprocessor-Based NAB Tape Cartridge Machine with Open Reel Quality" by John C. Fesler, Audio Engineering Society Preprint, 64th Convention, Nov. 2-5, 1979, New York, N. Y. p. 16.

Primary Examiner—Vincent P. Canney
Assistant Examiner—Surinder Sachar
Attorney, Agent, or Firm—Donald M. Sell; William B. Barte

[57] ABSTRACT

A device for dynamically indicating relative wear in a magnetic tape cartridge in which a specially identifiable signal is recorded on a separate track from that used for normal recording. Upon playback, the specially identifiable signal is recovered and compared with a "clean" reference signal to provide an error signal indicative of the amount of flutter present. The error signal sequentially activates an array of LED's to provide a relative, easily interpreted indication of the amount of flutter and hence of the extent of wear in the tape and cartridge.

10 Claims, 6 Drawing Sheets

MONITOR FOR VISUALLY INDICATING WEAR ON RECORD MEDIA

FIELD OF THE INVENTION

This invention relates to devices for detecting and indicating wear in record media and in particular, to such devices as are designed for use in radio broadcast studios to detect wear and performance degradation in prerecorded cartridges.

BACKGROUND OF THE INVENTION

Heretofore, a variety of devices have been used to monitor wear in audio cartridges such as the standard NAB cartridges commonly used in commercial radio broadcast studios. Such cartridges are typically used as program/message sources, and may be replayed numerous times, such as in the case of a popular song or commercial. If the cartridge/tape has worn such that the quality of reproduction has significantly decreased, the listener or advertiser may well be dissatisfied, to the ultimate economic detriment of the station. It is, therefore, important to detect the onset of such unsatisfactory performance, which may often precede the point at which even trained operators in a control room can audibly detect problems. Furthermore, in many instances, such trained ears may not be listening, particularly as stations rely more and more on automated operations.

Typical wear monitors used in the past have relied on some form of sensing the mechanical performance of the cartridge. Thus, for example, strain-gauge-like sensors have been spring loaded against the tape surface. The output, indicated on a meter or dial may then be monitored to detect undue variations in or excessive levels of tape tension. Similarly, tape tension has been monitored by measuring the relative current in the tape drive motor, for if the tape pack tension varies, the drive current required to maintain constant tape speed will also vary. It is also known to detect absolute cartridge failures, such as from jammed cartridges or broken tapes, etc., and to provide automatic switch-over signals, alarms, and the like.

While such techniques have been somewhat useful, they have generally been limited to either laboratory or maintenance environments where specially trained personnel and equipment may be present. No such techniques have been suggested for real-time, on-the-air broadcast studio use by relatively non-technically trained personnel.

SUMMARY OF THE INVENTION

The present invention is based upon an assumption that the typical broadcast cartridge will exhibit a predictable and measurable deterioration in performance before a catastrophic failure occurs. In order to better identify when an audio tape cartridge is reaching the end of its operational life, one must be able to easily identify early failure symptoms. Usually, audio tape cartridges experience progressive failure due to the gradual degradation of the cartridge tape. Operation of the present invention thus depends upon the failing cartridge displaying signs of mechanical breakdown before experiencing a total failure. Even though there are isolated instances of a cartridge failure occurring due to conditions other than the tape wearing out, the present invention does not purport to include these within its scope and purpose.

Signs of failure are most often a gradual worsening of the cartridge's flutter performance. This may be attributed to tape effects such as breakdown of lubricants, tape stretch and contamination of the oxide and lubricant surfaces with dirt, debris and cleaning chemicals. Other effects may also be due to wear within the cartridge housing, hub, etc. It has now been determined that as these effects combine during successive plays of the cartridge, tape pack friction increases in irregular, but measurable, amounts. These increases in friction produce minute linear tape speed irregularities and hence frequency variations of the audio signal during playback, which are easily measured using conventional flutter measuring equipment. However, such equipment is designed for use by trained personnel in off-the-air maintenance or laboratory environments and prohibit simultaneous flutter measurements while reproducing broadcast quality program material.

In direct contrast, the device of the present invention is designed for studio, on-the-air use, and allows for simultaneous reproduction of broadcast program material while providing a continuous, dynamic indication of the cartridge performance. Specifically, the device of the present invention relies upon a measurable increase in flutter over the life of the cartridge, and provides visual indications to the operator when the flutter exceeds various levels.

The device of the present invention is, therefore, for use with apparatus for recording and reproducing signals on and from a record medium, wherein message containing signals are recorded within at least a first track on the record medium, and certain cue signals are recorded at predetermined locations on a second track on the medium to define predetermined portions of the record of the message containing signals.

Thus, for example, NAB audio tape cartridge systems utilize an extra control, or cue track, that is recorded along the bottom edge of each tape parallel with the message or program tracks. The cue signals recorded in that track signal the reproducer equipment of certain events that occur along the length of the tape as it is played. In most situations, cue signals identify the beginning of each message, the approach of the end of each message, and the end of each message. Except for such uses, the cue track is otherwise virtually unused.

The device of the present invention thus comprises an encoder for providing a flutter detect cue signal which may be coupled to recording apparatus to be recorded onto the second or cue track at locations outside of the predetermined locations at which the other cue signals are recorded, but within portions corresponding to the locations at which message containing signals are recorded on the first track. The flutter detect cue signal contains uniquely identifiable components enabling it to be distinguished upon playback from the other cue signals.

The device further comprises a decoder for receiving and responding to cue signals from a playback apparatus. The decoder includes means such as a signal recognition circuit for producing a playback flutter detect cue signal based on the unique signal components. Means such as a summing amplifier are also included for comparing the playback flutter detect cue signal with a reference signal which contains the uniquely identifiable components to produce an error signal indicative of the relative magnitude of flutter in the playback flutter detect cue signal.

The decoder also includes means responsive to the error signal for producing parallel outputs, each successive output being activated upon the occurrence of an error signal the level of which exceeds a previous level by a given amount. Finally, the decoder includes a display which is coupled to each of the parallel outputs for producing a different visual indication upon the activation of each output, whereby the relative magnitude of flutter in the playback flutter detect cue signals is readily determinable by the visual indication thus produced.

Preferably, the flutter detect cue signal may be provided by a crystal driven oscillator which produces a substantially flutter-free sinusoidal signal having a predetermined fundamental frequency not present in the other cue signals. Thus, for example, in typical broadcast studio use, a primary 1000 Hz cue tone may be used to stop the tape just prior to the beginning of a message, while a secondary 150 Hz cue tone may be used to indicate the actual end of the message and a tertiary, 8 kHz cue tone may be used to warn of the approach of the end of a message. The oscillator thus preferably provides the flutter detect cue signal as a predetermined frequency which is not otherwise present, such as approximately 5.1 kHz, and which may be readily separated upon playback by relatively unsophisticated band-pass-filters and the like.

To further ensure that the flutter detect cue signal does not interfere with or become confused with the other cue signals, the encoder preferably includes inhibit means for preventing the production of the flutter detect cue signal whenever any of the other cue signals are present. Also, time delay means are desirably provided for preventing the production of the flutter detect cue signal for a predetermined period after the beginning of a message. This ensures that additional signals on the cue track, such as digitally encoded FSK data or the like as may be present to identify the specific programs recorded on the adjacent program track are not interfered with.

Likewise, the decoder preferably includes circuits especially suited to identify the playback flutter detect cue signal and to reliably quantify it as a measure of cartridge wear. As suggested above, such circuits may first desirably include a band-pass-filter, the output of which may be coupled to a phase locked loop network for providing a reference frequency at the predetermined fundamental frequency, against which the playback flutter detect cue signal may be compared.

DETAILED DESCRIPTION

Figure 1:
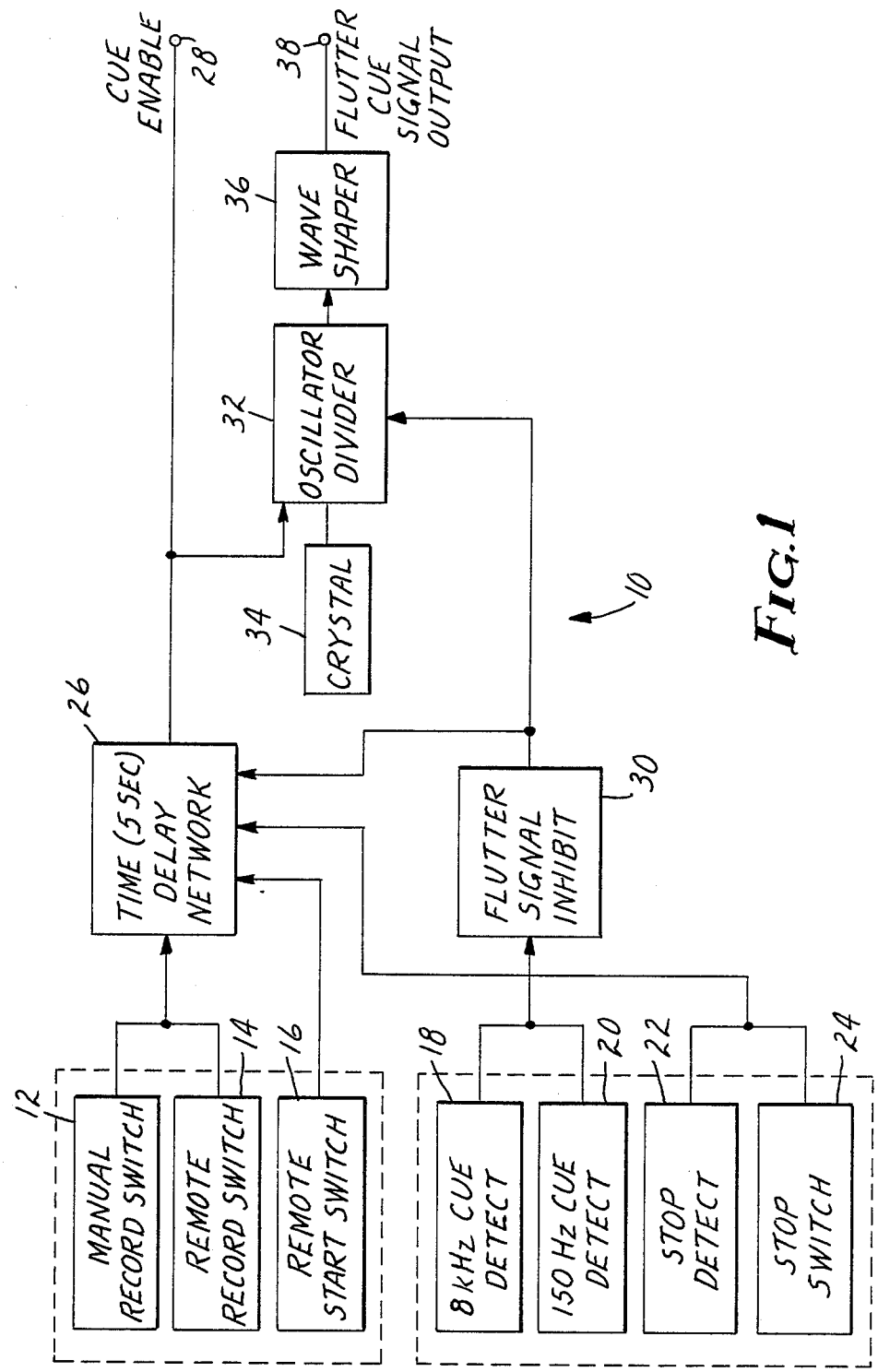
FIGS. 1 and 2 are block diagrams of the encoder and decoder portions respectively of one embodiment of the device of the present invention.

The present device preferably encompasses a simple "black box" add-on unit which is adapted to be used with conventional NAB cartridge recorder and reproducer decks. Typical of such equipment are the International Tapetronics Corporation/3M Models "RP", "99", "99B", "DELTA", and "OMEGA" cartridge machines. Such machines have the ability to provide cue track (audio) inputs and outputs.

The encoder and decoder making up the present device is preferably packaged as a single unit, but may also be packaged as two separate units, which may be operated separately, or in conjunction with one another. The functions of the encoder and decoder are independent, but logically controlled by the cartridge machine each is connected to. For example, if provided as separate units, the encode unit and decode unit may utilize separate power supply sources, with the encode unit utilizing power from the recording machine it is attached to, while the decode unit may operate from the line voltage, and not require power from the cartridge machines.

The encoder includes terminals allowing it to be attached to a cartridge recorder. In a preferred embodiment, it is capable of producing a low flutter 5.1 kHz sine wave, and contains the logic necessary to control timing of the cue tone circuits to enable the cue bias (record) logic of an associated record machine. Only one encoder is required per system, although more may be desired if there is more than one cartridge recorder in use within a given facility. The encoder produces its signal at a level sufficient to operate the cue record circuits of the companion recorder.

Each studio having a number of reproduccers will have at least one decoder. The decoder is thus preferably designed with multiple inputs to accept the output of several cue detect preamplifiers simultaneously. The decoder detects the playback cue signals previously applied by the record machine from the various machines, and provides an error, or wear, indication signal to a display device.

If provided as a separate unit, the physical appearance of the encode unit may be of secondary importance, as it is not necessary for it to be in view of the operator, and may be connected to the record unit via an integral multi-conductor cable.

Typical connections between the recorders and the encoder will provide for D.C. power from the recorder to operate the encoder electronics if desired, "Logic" connections from the recorder to operate the encoder logic circuits, "Logic" connections from the encoder to control the recorder's cue record circuits, and "Audio" connections from the encoder to the recorder's cue audio input connection.

The decoder contains the decoder electronics, display module and appropriate power supplies. It will usually be mounted in a high visibility location, such as near a control room console, or near a bank of cartridge playback machines. The decoder is thus preferably designed to provide smallest possible size, while affording a pleasing appearance and display viewing ease, and need only provide for connection to a source of A.C. power and to the cue outputs of the playack machines. Thus, for example, a front panel may be formed of polycarbonate through which the display (LED lamps, etc.) is visible. The polycarbonate may be smoked, or colored, in order to enhance LED visibility. Preferably, the display includes a tri-colored green, yellow, and red multiple-segment LED array. Such a display will then indicate the presence of a cartridge encoded with a flutter detect cue signal by illuminating the green LED when the special flutter signal is detected. Four yellow, and one red LED indicate the relative amount of flutter, in the system. The yellow and red LED's preferably indicate relative flutter in various increments beginning at 0.14% and ending at 0.26%.

A simplified block diagram of such a preferred encoder unit 10 is set forth in FIG. 1. As there shown, the encoder is adapted to receive a number of inputs from an associated cartridge recorder, and in response, to output cue enable and flutter detect cue signals. The encoder also includes a manual record switch 12, such as located on the front panel, which when pressed may also initiate encoding operations. Inputs from an associated cartridge recorder may correspond to the recorder's remote record switch 14 and remote start switch 16. Also, inputs 18 and 20 are provided from the recorder's 8 kHz and 150 Hz cue detect outputs, respectively. Finally, inputs 22 and 24 are provided from the recorders stop detect output and stop switch outputs respectively.

With such inputs, operation of the encoder 10 is substantially automatic, as a flutter detect cue signal will be initiated upon the appearance of an input from the manual record switch 12 or the remote record switch 14 and remote start switch 16, and will be discontinued upon the appearance of any of the stop inputs 18, 20, 22, or 24.

The respective start inputs 12, 14 and 16 are coupled to a time delay network 26, which after a predetermined time delay, such as five seconds, provides a flutter cue enable signal at output terminal 28. This delay ensures that other cue signals as well as digitally encoded (FSK or the like) information may be recorded on the cue track, and that the recording of the flutter detect cue signal on the same track will not interfere. Since the digitally encoded information usually occupies the first several seconds of the cue track immediately following the primary 1 kHz cue tone indication of the beginning of a message, the delay ensures that all such digital data has passed before the flutter cue enable signal is produced.

Similarly, the connections 18 and 20 to the recorder's secondary or tertiary cue detect circuits allows logical interaction to "stop" or inhibit the production of the flutter cue signal at the initiation of end-of-message sequences. This prevents the flutter cue signals from being recorded beyond the end of the message and also prevents the possibility of interaction with "enabled" broadband cue detectors.

As shown in FIG. 1, the inputs 18 and 20 are coupled to an inhibit network 30, the output of which is further coupled to the time delay network 26. Also, signals from the stop detect 22 and stop switch 24 are coupled to the inhibit network 30. Inputs at any of these terminals prevent the flutter cue enable signal from being produced.

The flutter detect cue signal, such as a 5.1 kHz sinusoidal tone, is desirably generated within the oscillator/divider circuit 32, the oscillating frequency of which is controlled by crystal 34. In order to conveniently produce a highly stable frequency, it is preferred to establish a relatively high initial frequency within the oscillator 32, such as at 5.223 MHz, and to divide that frequency within the oscillatordivider 32 to produce the ultimately desired frequency of 5.1 kHz. Further, while the oscillator circuit 32 produces highly stable fundamental frequency, it is essentially a square wave, thus the output is coupled to a waveshaping circuit 36, such as a low pass filter, which converts the square wave to a substantially sinusoidal 5.1 kHz waveform, outputted at terminal 38.

Figure 2:
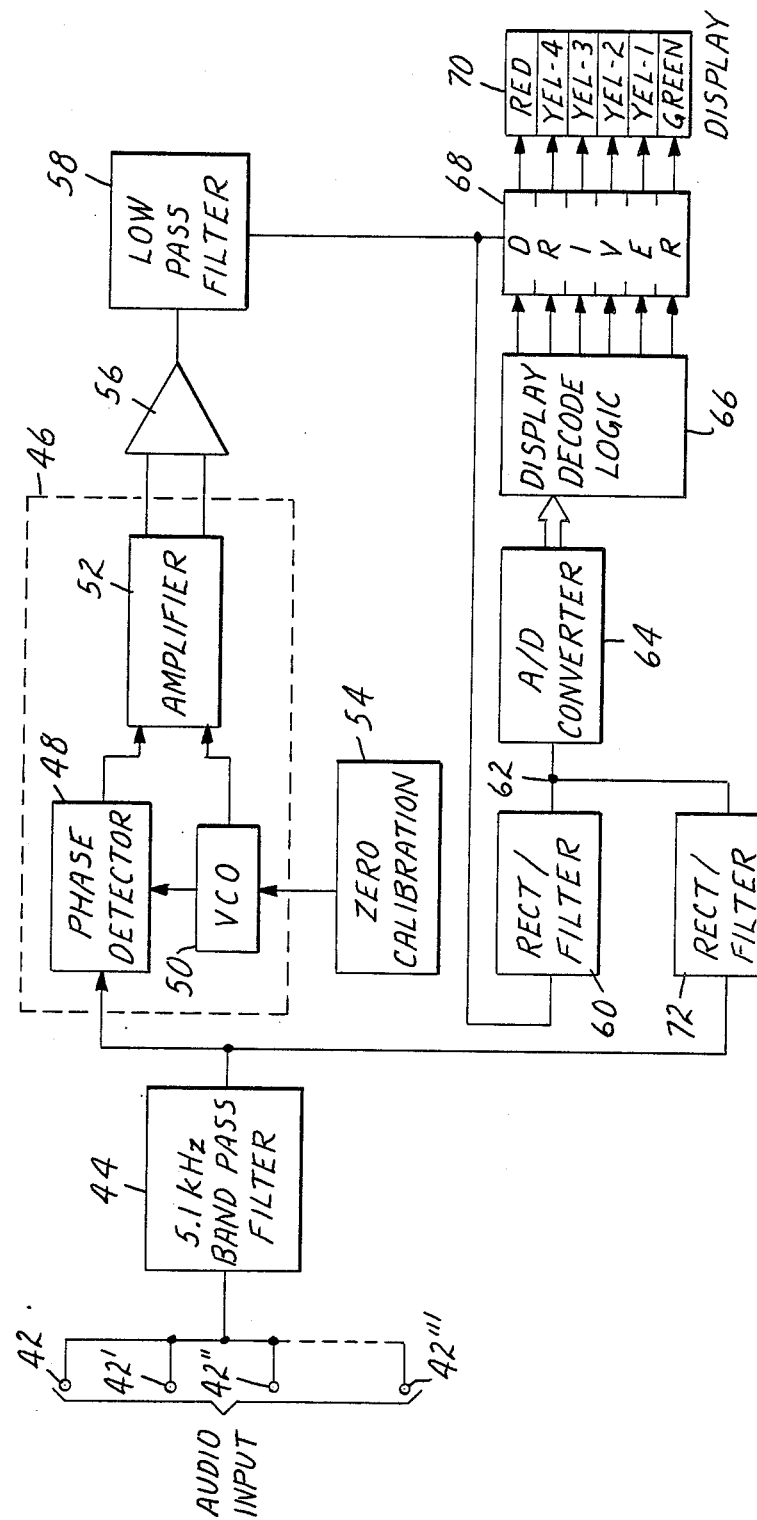

As noted above and as further shown in the block diagram of FIG. 2, the decoder 40 of a preferred embodiment of the present invention is adapted with a plurality of inputs 42, 42', 42'', and 42''', each of which may be connected to the cue audio outputs of cartridge reproducer machines. These respective inputs are coupled to a band-pass-filter 44 having a center pass frequency of 5.1 kHz, and which thus strips a playback flutter detect cue signal from the other cue signals by passing only the 5.1 kHz component. The reproduced flutter detect cue signal contains whatever flutter error as may have been introduced during playback. This error containing signal is processed in a phase locked loop network 46 including a phase detector 48, voltage controlled oscillator (VCO) 50 and amplifier 52 to produce an error signal superimposed on a D.C. voltage and a reference D.C. voltage.

These two outputs from the phase locked loop 46 are in turn coupled to a differential summing amplifier 56 which produces an output error signal representing the amount of flutter present in the playback flutter detect cue signal. The error signal is passed through a low pass filter 58, which ensures that only the true flutter components are further acted upon. After passing through a further rectifier and filter stage 60, the error signal is coupled through a gate 62 to an analog to digital converter 64 which provides a digital parallel encoded output, representative of the level of the error signal. The parallel digital representation is in turn coupled to a programmable array logic network 66 which is programed to respond by providing at a plurality of outputs a succession of states, each successive state being activated in the event the error signal represented by the input digital signal increases from the previous level a given amount. Each of the outputs from the logic network 66 is coupled to one section of a display driver circuit 68, each output of which drives one of the LED's within the display 70.

To ensure that the display is not energized by noise or other extraneous signals, the 5.1 kHz playback flutter detect cue signal from the filter 44 is also coupled through a rectifier filter 72 to control the gate 62, thereby preventing signals from passing for a short period so that the display is not momentarily activated when the cue signal first appears.

The decode logic network 66 is desirably programed to cause an appropriate indicator LED within the display 70 to be energized, depending upon the extent of flutter detected. While the relative sensitivity of the device, i.e., the flutter level at which a given LED is energized may be left to the control of each operator it is preferable that the sensitivity level be set to correspond with recognized NAB flutter levels.

Figure 3:
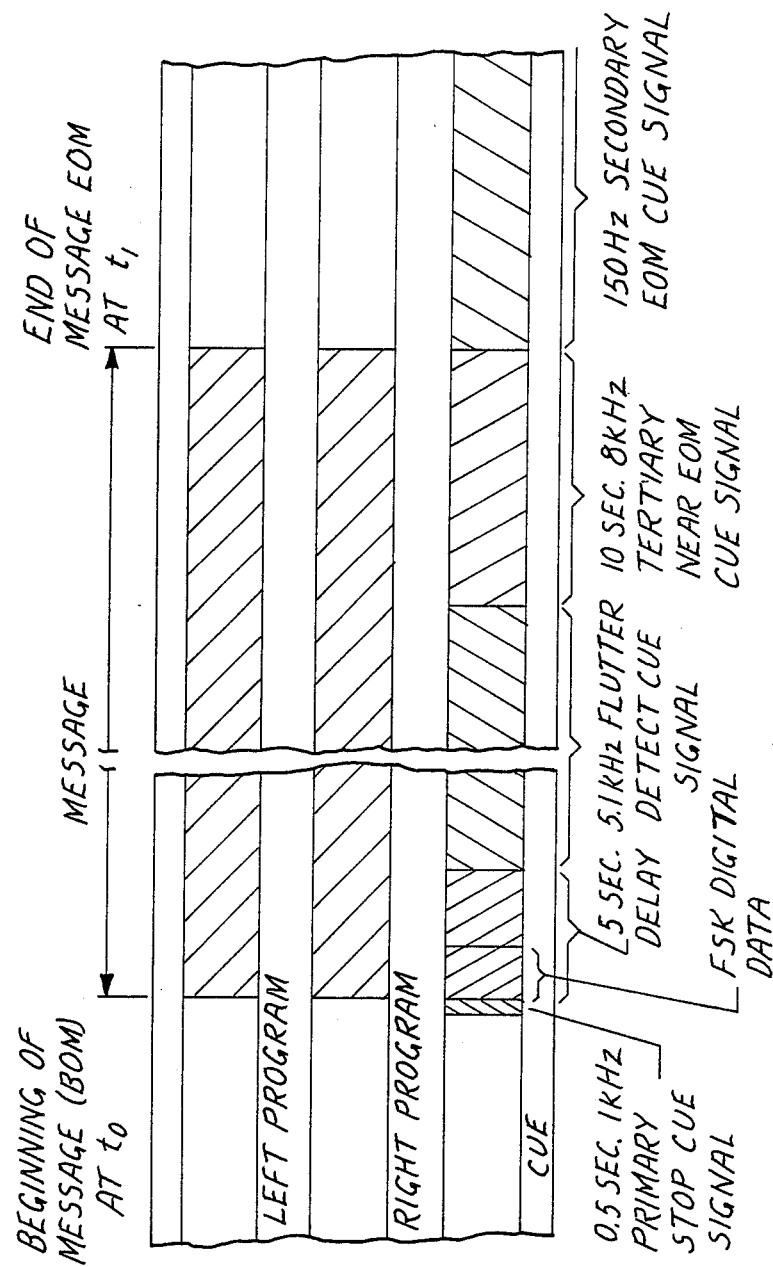
FIG. 3 depicts the spatial relationships between messages on two tracks of a record medium and various cue signals, including that utilized by the device of the present invention, on another track of the medium.

To further clarify the relative spatial position of message or program information and the respective cue signals, a simulated model of an encoded tape is shown in FIG. 3. As is there set forth, stereo program information may be recorded on separate tracks A and B, with the beginning of message (BOM) occurring at time $t_0$ and the end of message (EOM) occurring at time $t_1$. Correspondingly, a 1 kHz primary cue signal may be recorded on the cue track, beginning 0.5 seconds before the BOM to enable the cartridge to be stopped with the tape positioned for immediate playback of the message when the reproducer is next switched into the play mode. Digital data, such as FSK encoded information pertaining to the identity of the specific program recorded on the adjacent program tracks may be desirably provided after the cessation of the primary cue signal, which data may continue for several seconds past the BOM. Accordingly, the 5 second delay is provided to prevent the beginning of the 5.1 kHz flutter detect cue signal until all such digital data has ended. The flutter cue signal desirably continues for substantially the same duration as the program recorded on the other tracks, and is terminated by the occurrence of either the secondary 150 Hz cue tone, which indicates EOM, or the occurrence, if present, of the 8 kHz tertiary cue tone, indicating that the EOM is approaching.

Figure 4:
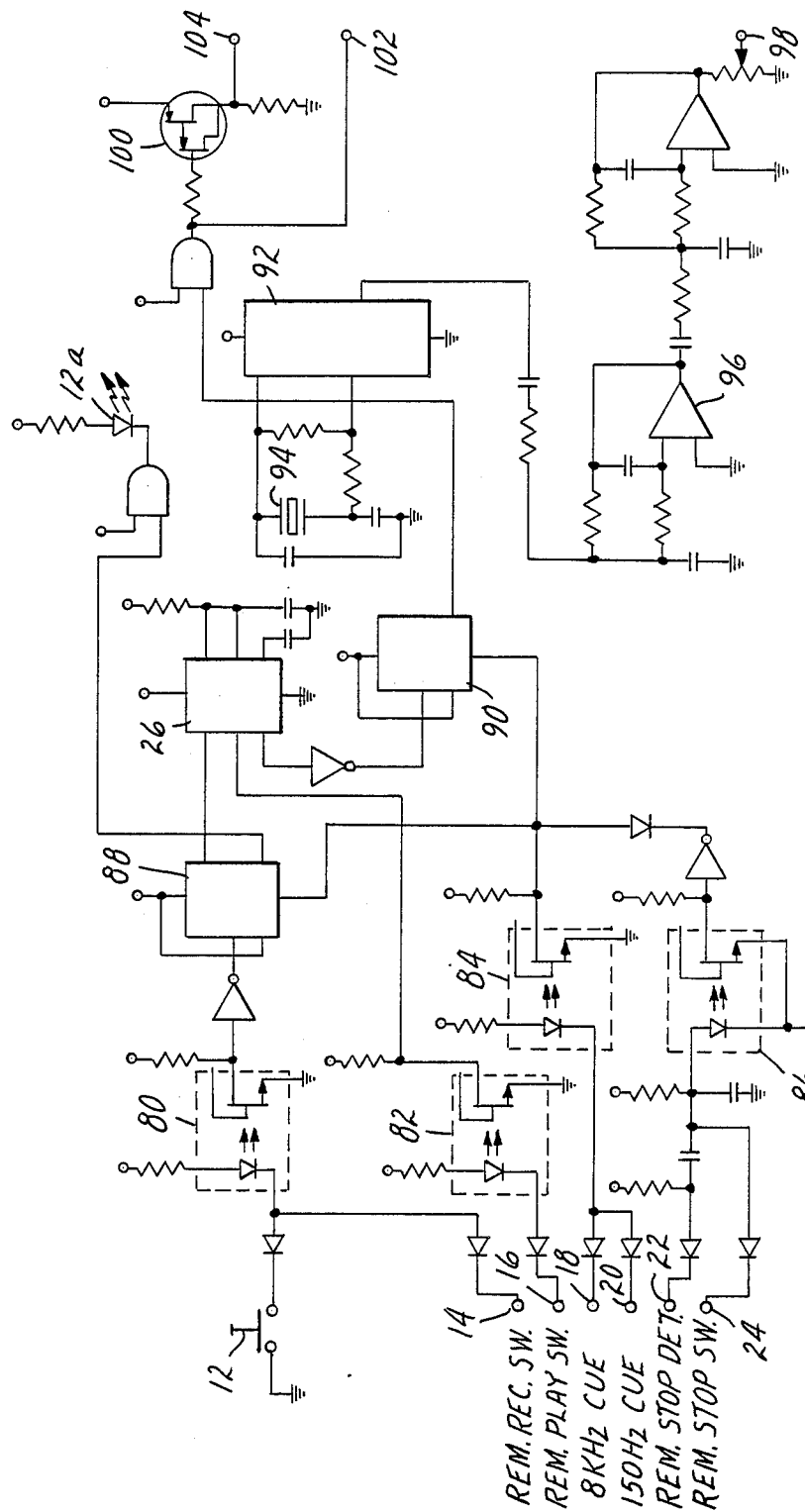
FIGS. 4, 5A and 5B are detailed schematic diagrams of the encoder and decoder shown in FIGS. 1 and 2 respectively.

A detailed schematic of the preferred encoder shown in block diagram form in FIG. 1 is set forth in FIG. 4. It may there be seen that signals from the manual record switch 12 and as inputted at terminals 14, 16, 18, 20, 22 and 24 are coupled through diodes and photoisolators 80, 82, 84 and 86. The ouptut from the first photoisolator .80 is coupled to set a flip-flop 88, which in turn enables the time delay network 26. The inputs to the flip-flop 88 are from either the manual record enable switch 12 or a remote record switch on terminal 14. The flip-flop 88 will be set either whenever an associated recorder has been set in the record mode, or when the manual record switch 12 is pressed. Another output from flip-flop 88 will then cause LED 12a within the panel switch 12 to be energized.

When the start switch on the associated recorder is pressed, an input at terminal 16 will be coupled through photoisolator 82, which in turn triggers the time delay network 26. That network is preferably a type 555 integrated circuit, having a 5 second time constant set by the associated RC network.

At the end of the time delay period, the network 26 outputs an enable pulse to another flip-flop 90, which in turn turns on the oscillatordivider circuit 92. The basic frequency of this circuit is determined by the crystal 94 to be 5.223 MHz, which is then divided down by a factor of 1024 to produce an output square wave at 5.1 kHz. The square wave output is coupled to a waveshaping network 96, which is essentially a two stage low pass filter, and which strips off all harmonics and allows only the fundamental 5.1 kHz frequency to pass, resulting in a sinusoidal output at terminal 98. The output from flip-flop 90 is also coupled to a cue nnable circuit 100 to provide cue bias enable signals at terminals 102 and 104 respectively.

When other cue signals, such as either a secondary 150 Hz or tertiary 8 kHz signal are inputted at terminals 18 or 20 respectively, those signals are coupled through photoisolators 84 and reset flip-flops 86 and 90, thus stopping both the time delay network 26 and oscillator/divider 92. Similarly, a stop signal occurring at either terminal 22 or 24 is coupled through photo isolator 86 to reset the flip-flops 86 and 90.

The operation of such an encoder is relatively straightforward, and does not normally require any special effort on the part of an operator. The encoder allows for two basic types of operation: encoding a blank cartridge, and encoding a previously recorded, but non-encoded cartridge.

Encoding a blank cartridge may be done only on a cartridge machine having record/reproduce capability. This will usually be in a production room or dubbing enter, where most facility recording is done. In such a facility, an operator will insert a prepared cartridge into the cartridge machine, and press the record button. This will automatically arm the recording circuit in the encoder and illuminate the record switch lamp 12a. The operator will next press the play switch on the cartridge machine, and begin recording program material on the cartridge. This causes the encoder to sense the record and run conditions of the cartridge machine. The timing circuit 26 in the encoder counts out 5 seconds, then enables the cartridge machine's cue bias to automatically begin recording the flutter detect cue signal on the cartridges's cue track. At the end of the program material, the operator would normally conclude the recording, and the encoder will then automatically sense end-of-message (EOM) cue tones or cartridge "stop" signals which will immediately terminate the encoding process.

The encoder also allows a flutter detect cue signal to be encoded onto existing cartridge libraries without disturbing any previously recorded program material or cue tones. Thus if encoding a previously recorded, but non-encoded cartridge, an operator will first insert the previously recorded cartridge into the record/reproduce cartridge machine, but will not press the record button on the cartridge machine, as that would erase the previously recorded program material. The operator would next press the manual record switoh 12 on the front panel of the encoder and then press the "play" button on the cartridge machine. As the cartridge plays back, the encoder will enable the recorder's cue bias circuits, causing flutter detect cue signal to be recorded on the cartridge's cue track. At the end of the playback of the program material, the encoder will automatically sense the end-of-message (EOM) cue tones, or the cartridge "stop" signals and will immediately terminate the encoding process.

Figure 5A:
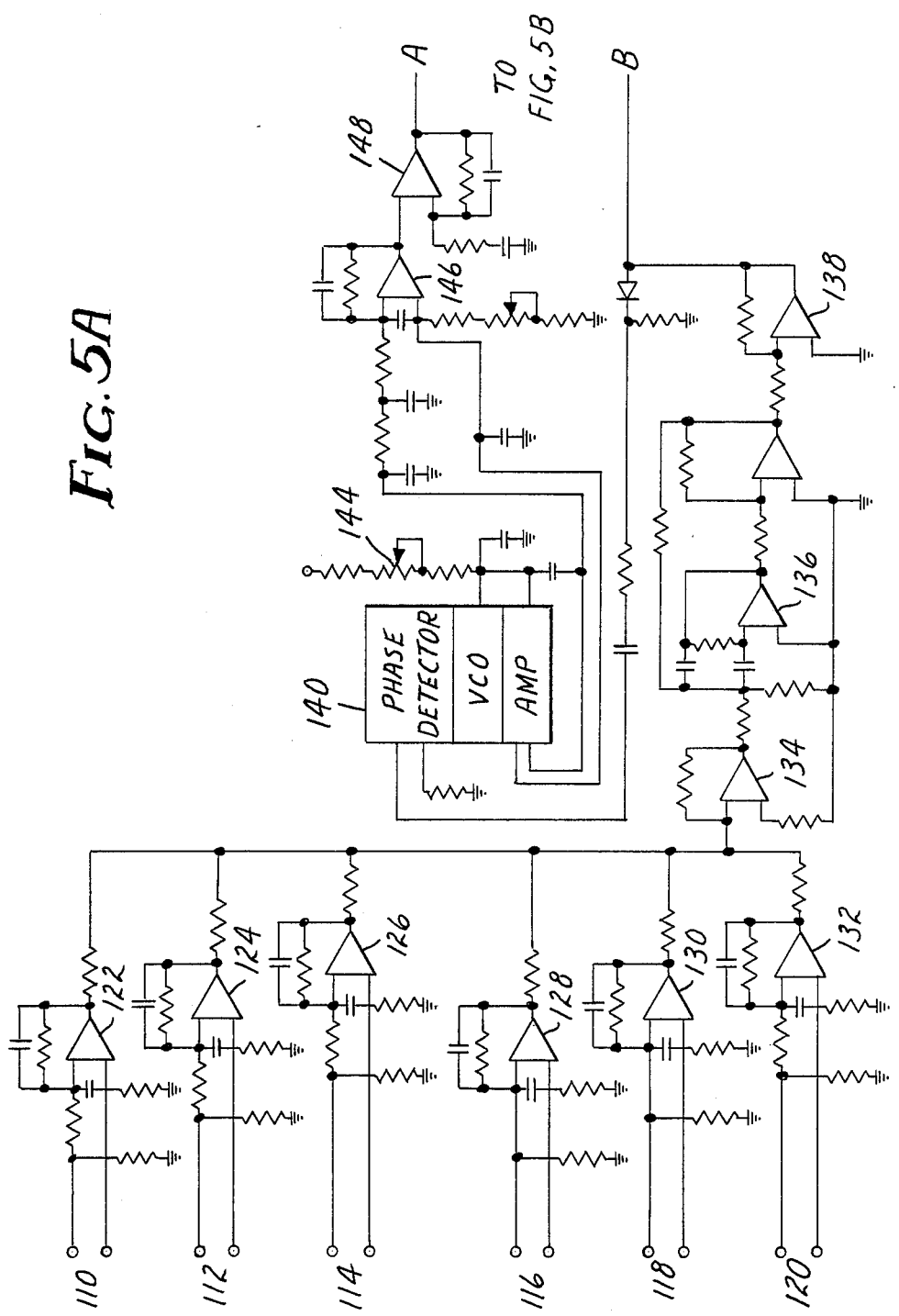
Figure 5B:
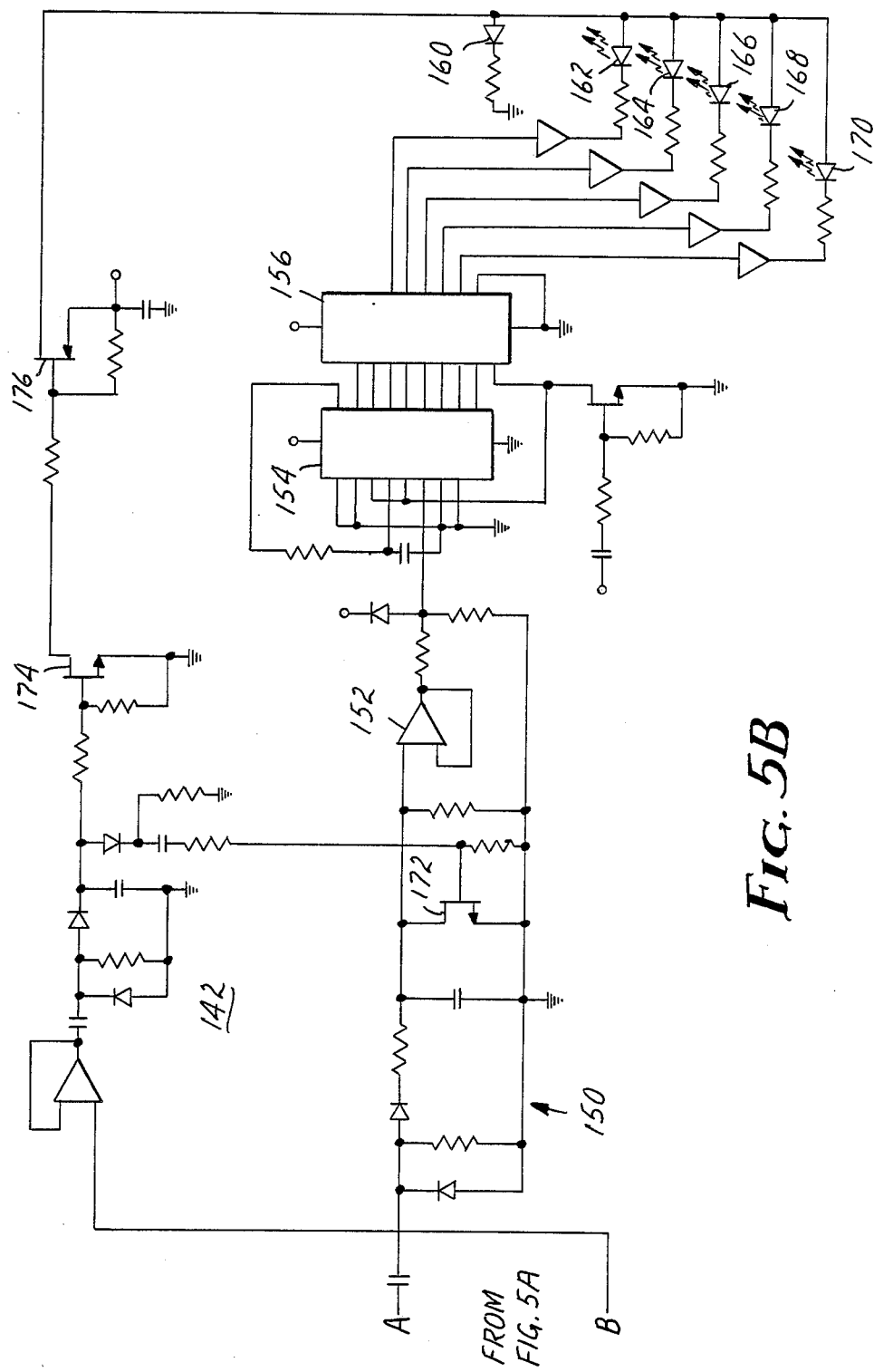

A detailed schematic of the decoder shown in the block diagram of FIG. 2 is set forth in FIGS. 5A and 5B. It will thus be seen that dual-ended cue signal outputs from a number of cartridge playback mechanisms may be received at terminals 110, 112, 114, 116, 118 and 120. Each input is coupled through a buffer amplifier 122, 124, 126, 128, 130 and 132, respectively, and the common outputs are tied together and pass through another buffer amplifier 134 to a band-pass-filter 136, which separates the 5.1 kHz flutter detect cue signal from the other cue signal components by passing only frequencies centered at 5.1 kHz. The resultant playback flutter detect cue signal is then passed through a squaring amplifier 138 to the error detector 140 and to a threshold detector 142.

The error detector 140 is preferably a phase locked loop integrated circuit such as a type LM565, and includes a phase detector, voltage controlled oscillator and amplifier. The detector processes the received playback flutter detect cue signal and produces both that signal, with whatever flutter components as may be modulated onto the 5.1 kHz carrier and a reference signal containing only the fundamental frequency contained in the incoming playback flutter detect cue signal. A zero calibrate network 144 is also included as an input to the error detector 140 to allow the two outputs to be balanced when no flutter components are present. The two signals are then coupled to a differential summing amplifier 146 which outputs an error signal corresponding to the differences between the two compared signals.

The error signal is further processed to sequentially energize a bank of LED's, depending upon the level of error, i.e., flutter present. Thus, the error signal is preferably coupled through a low pass filter 148 to ensure that only true flutter components are included in determining the flutter level. The signal then passes through a rectifier-filter network 150 and buffer 152 to an analog to digital converter 154, such as a conventional 8-bit A/D converter such as an integrated circuit type ADC0804. The parallel outputs of the converter 154 are coupled to a programmable array logic circuit 156, such as an integrated circuit type 16R6, which sequentially energizes a series of outputs, depending upon the level of the error signal incoming to the A/D converter 154. Each of the respective outputs of the logic circuit 156 is coupled through a driver amplifier to a given LED forming a part of the display. Thus the first or green LED 160 is energized whenever a flutter cue signal is present, while rest of the LED's 162, 164, 166, 168 and 170 are sequentially illuminated at successively higher error signal levels.

As noted above, while the overall sensitivity may be adjusted by the operator, preferably the green LED 160 is enabled when the flutter detect cue signal is detected. The intermediate yellow LED's 162, 164, 166 and 168 are desirably successively activated at approximately 0.03% incremental increases in flutter level, with the final, red LED 170 coiing on when the detected flutter level exceeds 0.26%. In order to allow the operator to adjust the overall sensitivity, the outputs of the logic circuit 156 are desirably provided with a number of jumpers which can be alternately connected to cause the first yellow or warning LED 162 to flicker at a lower flutter level.

To ensure that the display is activated only by true detected flutter signals, threshold detector 142, which receives the playback flutter detect cue signal after passing through another rectifier-filter circuit, controls the transistor switches 172, 174 and 176. Accordingly, when the 5.1 kHz carrier is first present, switch 172 is momentarily turned on, the input to the A/D converter is shunted, and all but the green LED's are disabled. At the same time, switch 174 is turned on, thus completing the connections to the LED array.

It is also preferred to provide an alarm to the operator in the event the detected error signal exceeds a given level. Accordingly, the programmable array logic circuit 156 may be programmed to output an alarm signal by selecting an appropriate jumper at its output. The alarm signal is desirably coupled through an approximately 0.25 sec. time delay circuit, to prevent the alarm from being activated by sort-term error signals, and thence to a relay, allowing users to connect desired alarm indicators. The alarm signal may also be coupled back to the logic circuit 156 to latch the alarm in a continuously activated state, which state is unlatched upon cessation of the detected flutter cue signal.

The operation of the decoder is both automatic and continuous, and the only interaction required by an operator is to occasionally glance at the display during playback. As noted above, during "normal" playback of the cartridges in a control room, up to six (6) playback decks may be connected to a single decoder. When an encoded cartridge is played, a green LED on the front panel will illuminate, indicating the decoder has sensed a properly encoded cartridge.

The LED's within the display are desirably arranged with the green LED, four yellow LED's, and one red LED, reading from left to right. From the left, the display then indicates gradually increasing flutter content. The first yellow LED indicates approximately 0.14% flutter, and the red LED indicates approximately 0.26% flutter. The NAB allowed flutter specification is 0.15%.

As thus configured, when a new cartridge is decoded, the display will initially show a green LED, indicating decoding is taking place. An occasional flickering of the first or second yellow LED may also occur, and is normal, and represents a "good" cartridge. When decoding an aging cartridge, the display will show a green LED, and may also show several yellow LED's, indicating a higher relative amount of flutter. A cartridge which illuminates all yellow LED's, and is also flickering the red LED is showing very high flutter content. This cartridge is probably producing audible problems, and may also be in the process of failing.

It has thus been determined that the use of the encoder-decoder device described above enables the determination of the typical condition of cartridges in use by repeated observations of the bar graph display. With the use of this information, one may establish a local standard for cartridge performance, and cartridges falling outside that norm may then require special handling or replacement.

What is claimed is:

1. A device for dynamically indicating relative wear in a cartridge containing recorded magnetic tape based on the amount of flutter present in signals reproduced from the tape, wherein message containing signals are recorded within at least a first track on said tape and a plurality of first cue signals are recorded on a second track on said tape at predetermined locations relative to the locations on said first track to define predetermined portions of the message containing signals, said device comprising:

(a) encode means including
  (i) means for providing flutter detect cue signals containing uniquely identifiable components distinguishable upon playback from said first cue signals and
  (ii) means responsive to said first cut signals for enabling recording said flutter detect cue signal onto said second track at locations outside of said predetermined locations and at least nominally coextensive with said locations at which said message containing signals are recorded on said first track, and (b) decode means responsive to cue signals reproduced from said second track concurrently with said message containing signals reproduced from said first track, including
  (i) means responsive to said unique signal components of said reproduced cue signals for producing a playback flutter detect cue signal,
  (ii) means for comparing said playback flutter detect cue signal with a reference signal containing said uniquely identifiable components to produce an error signal indicative of the relative magnitude of flutter in said playback signal on said second track,
  (iii) means responsive to said error signal for producing parallel outputs, each successive output being activated upon the occurrence of an error signal the level of which exceeds a previous level by a given amount, and
  (iv) display means coupled to each of said plurality of successive outputs for producing a different visual indication upon the activation of a given successive output, whereby the relative magnitude of flutter in said playback signal and hence the amount of wear is readily determinable by the visual indication thus produced.

2. A device according to claim 1, wherein said encode means comprises inhibit means for preventing the production of flutter detect cue signals when said first cue signals are present.

3. A device according to claim 2, wherein said inhibit means comprises time delay means for preventing the production of a said flutter detect cue signal for a predetermined period after receipt of indications that said message containing signals are present.

4. A device according to claim 1, wherein said encode means includes oscillator means for producing as a said flutter detect cue signal a substantially sinusoidal signal free of significant amplitude distortion and flutter and having a fundamental frequency not present in said first cue signals.

5. A device according to claim 4, wherein said encode means comprises means responsive to said first cue signals for inhibiting said oscillator means when said first cue signals are present.

6. A device according to claim 1, wherein said decode means comprises filter means for separating from said playback cue signals a predetermined fundamental frequency indicative of said playback flutter detect cue signals.

7. A device according to claim 6, wherein said decode means comprises phase locked loop means responsive to said playback flutter detect cue signals for providing a substantially sinusoidal reference signal free of significant amplitude distortion and having a said predetermined fundamental frequency.

8. A device according to claim 7, wherein said comparing means comprises differential amplifier means for summing said sinusoidal reference signal with said playback flutter detect cue signal, the output of which represents phase differences between the two signals, which differences are indicative of the magnitude of flutter in said playback flutter detect cue signals.

9. A device according to claim 1, wherein said decode means further comprises threshold detect means for enabling said display means only when said playback flutter detect cue signals in excess of a predetermined level are present.

10. A device according to claim 1, wherein said output producing means comprises programmable array logic means responsive to a digital representation of said error signal.

* * * * *